United States Patent
Pujar et al.

(10) Patent No.: US 11,429,352 B2
(45) Date of Patent: Aug. 30, 2022

(54) BUILDING PRE-TRAINED CONTEXTUAL EMBEDDINGS FOR PROGRAMMING LANGUAGES USING SPECIALIZED VOCABULARY

(71) Applicant: INTERNATIONAL BUSINESS MACHINES CORPORATION, Armonk, NY (US)

(72) Inventors: Saurabh Pujar, White Plains, NY (US); Luca Buratti, White Plains, NY (US); Alessandro Morari, New York, NY (US); Jim Alain Laredo, Katonah, NY (US); Alfio Massimiliano Gliozzo, Brooklyn, NY (US); Gaetano Rossiello, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/917,967

(22) Filed: Jul. 1, 2020

(65) Prior Publication Data
US 2022/0004365 A1    Jan. 6, 2022

(51) Int. Cl.
*G06F 8/30* (2018.01)
*G06N 20/00* (2019.01)
(Continued)

(52) U.S. Cl.
CPC .................. *G06F 8/31* (2013.01); *G06F 8/40* (2013.01); *G06F 9/445* (2013.01); *G06F 40/40* (2020.01); *G06N 20/00* (2019.01)

(58) Field of Classification Search
CPC ............ G06G 8/31; G06G 40/40; G06G 8/40; G06G 9/445; G06N 20/00
See application file for complete search history.

(56) References Cited

U.S. PATENT DOCUMENTS

| | | |
|---|---|---|
| 9,935,972 B2 | 4/2018 | Zhang |
| 10,540,438 B2 * | 1/2020 | Nagarajan ............... G06N 20/00 |

(Continued)

FOREIGN PATENT DOCUMENTS

| | | |
|---|---|---|
| CN | 108549817 A | 9/2018 |
| CN | 110688861 A | 1/2020 |

OTHER PUBLICATIONS

Jongho Shin et al., "Cross-domain meta-learning for bug finding in the source codes with a small dataset", [Online], pp. 1-6, [Retrieved from Internet on Jun. 18, 2022], <https://dl.acm.org/doi/pdf/10.1145/3424954.3424957>, (Year: 2020).*

(Continued)

*Primary Examiner* — Ziaul A Chowdhury
(74) *Attorney, Agent, or Firm* — Jordan Schiller

(57) ABSTRACT

A method, a computer system, and a computer program product for building pre-trained contextual embeddings is provided. Embodiments of the present invention may include collecting programming code. Embodiments of the present invention may include loading and preparing the programming code using a specialized programming language keywords-based vocabulary. Embodiments of the present invention may include creating contextual embeddings for the programming code. Embodiments of the present invention may include storing the contextual embeddings.

17 Claims, 5 Drawing Sheets

(51) Int. Cl.
*G06F 40/40* (2020.01)
*G06F 8/40* (2018.01)
*G06F 9/445* (2018.01)

(56) References Cited

U.S. PATENT DOCUMENTS

| | | | |
|---|---|---|---|
| 10,581,888 | B1 | 3/2020 | Agranonik |
| 10,606,946 | B2 | 3/2020 | Gao |
| 2016/0212153 | A1 | 7/2016 | Livshits |
| 2018/0157644 | A1 | 6/2018 | Mandt |
| 2018/0285397 | A1 | 10/2018 | Huang |
| 2019/0050319 | A1 | 2/2019 | Gondalia |
| 2019/0197097 | A1* | 6/2019 | Nagarajan ............. G06F 40/205 |
| 2019/0215329 | A1 | 7/2019 | Levy |
| 2019/0324744 | A1 | 10/2019 | Alam |
| 2019/0325273 | A1 | 10/2019 | Kumar |
| 2019/0370473 | A1 | 12/2019 | Matrosov |
| 2020/0050207 | A1 | 2/2020 | Huber |
| 2020/0076841 | A1 | 3/2020 | Hajimirsadeghi |
| 2020/0076842 | A1 | 3/2020 | Zhou |
| 2020/0097809 | A1 | 3/2020 | Velasco |
| 2020/0183681 | A1* | 6/2020 | Ramsl ..................... G06F 40/30 |
| 2020/0249918 | A1* | 8/2020 | Svyatkovskiy ...... G06N 3/0472 |
| 2021/0056211 | A1 | 2/2021 | Olson |
| 2021/0271455 | A1* | 9/2021 | Svyatkovskiy ...... G06N 3/0445 |
| 2021/0327413 | A1* | 10/2021 | Suwandy ................ G06F 40/30 |
| 2022/0004642 | A1 | 1/2022 | Pujar |

OTHER PUBLICATIONS

Anonymous authors, "Pre-Trained Contextual Embedding of Source Code", [Online], pp. 1-20, [Retrieved from Internet on Jun. 18, 2022], <https://openreview.net/pdf?id=rygoURNYvS>, (Year: 2019).*
Allamanis et al., "Learning To Represent Programs With Graphs", published as a conference paper at ICLR 2018, May 4, 2018, pp. 1-17.
Allamanis et al., "A Survey of Machine Learning for Big Code and Naturalness", May 5, 2018, pp. 1-36.
Babii et al., "Modeling Vocabulary for Big Code Machine Learning", Apr. 3, 2019, pp. 1-12.
Beltagy et al., "SciBERT: A Pretrained Language Model for Scientific Text", Sep. 10, 2019, 6 pages.
Chen et al., "Strategies for Training Large Vocabulary Neural Language Models", Dec. 15, 2015, 13 pages.
Chen et al., "A Literature Study of Embeddings on Source Code", Apr. 5, 2019, pp. 1-8.
Devlin et al., "BERT: Pre-training of Deep BiDirectional Transformers for Language Understanding", May 24, 2019, 16 pages.
Feng et al., "CodeBERT: A pre-Trained Model for Programming and Natural Languages", Feb. 19, 2020, 11 pages.
Hindle et al., "On the Naturalness of Software", ICSE 2012, Zurich, Switzerland, 2012 IEEE, pp. 837-847.
Kanade et al., "Pre-trained Contextual Embedding of Source Code", Jan. 3, 2020, pp. 1-22.
Karampatsis et al., "Maybe Deep Neural Networks are the Best Choice for Modeling Source Code", Mar. 13, 2019, 12 pages.
Lee et al., "BioBERT: a pre-trained biomedical language representation model for biomedical text mining", Bioinformatics, 2019, 1-7, Advance Access Publication Date: Sep. 10, 2019, Original paper, OXFORD.
Li et al., "VulDeepecker: A Deep Learning-Based System for Vulnerability Detection", Network and Distributed Systems Security (NDSS) Symposium 2018, Feb. 18-21, 2018, San Diego, CA, USA, 15 pages.
Ray et al., "On the 'Naturalness' of Buggy Code", 2016 IEEE/ACM 38th IEEE International Conference on Software Engineering, ICSE' 16, May 14-22, 2016, Austin, TX, USA, pp. 428-439.
Raychev et al., "Code Completion with Statistical Language Models", PLDI 2014, Jun. 9-11, 2014, Edinburgh, United Kingdom, 2014 ACM, pp. 419-428.
Russell et al., "Automated Vulnerability Detection in Source Code Using Deep Representation Learning", 17th IEEE International Conference on Machine Learning and Applications (IEEE ICMLA 2018), Orlando, Florida, USA, 7 pages.
Tai, "Effects of Inserting Domain Vocabulary and Fine-tuning BERT for German Legal Language", University of Twente, deepset, Master's Thesis, Nov. 26, 2019, 91 pages.
Vaswani et al., "Attention is all You Need", Dec. 6, 2017, 31st Conference on Neural Information processing Systems (NIPS 2017), Long Beach, CA, USA, 15 pages.
Zhou et al., "Devign: Effective Vulnerability Identification by Learning Comprehensive Program Semantics via Graph Neural Networks", 33rd Conference on Neural Information Processing Systems (NeurIPS 2019), Vancouver, Canada, 11 pages.
Mell et al., "The NIST Definition of Cloud Computing", Recommendations of the National Institute of Standards and Technology, Special Publication 800-145, Sep. 2011, 7 pages.
Grace Period Disclosure, Buratti et al., "Exploring Software Naturalness through Neural Language Models", arXiv:2006.12641V2 [cs.CL] Jun. 24, 2020, 12 pages.
IBM: List of IBM Patents or Patent Applications Treated as Related (Appendix P), Jul. 6, 2020, 2 pages.
Pujar et al., "Vulnerability Analysis Using Contextual Embeddings", U.S. Appl. No. 16/917,962, filed Jul. 1, 2020, 34 pages.

* cited by examiner

BUILDING PRE-TRAINED CONTEXTUAL EMBEDDINGS FOR PROGRAMMING LANGUAGES USING SPECIALIZED VOCABULARY

STATEMENT REGARDING PRIOR DISCLOSURES BY THE INVENTOR OR A JOINT INVENTOR

The following disclosure is submitted under 35 U.S.C. § 102(b)(1)(A): DISCLOSURE: The document, entitled "Exploring Software Naturalness Through Neural Language Models, authored by Luca Buratti, Saurabh Pujar, Mihaela Bornea, Scott McCarley, Yunhui Zheng, Gaetano Rossiello, Alessandro Morari, Jim Laredo, Veronika Thost, Yufan Zhuang, and Giacomo Domeniconi was made publicly available on Jun. 22, 2020 on the publication arXiv (https://arxiv.org/pdf/2006.12641.pdf).

BACKGROUND

The present invention relates generally to the field of computing, and more particularly to natural language processing (NLP). Computer code is written in a style that is more repetitive than natural language. Natural language also has a limited number of words that can be used, however, computer programming code allows software developers to create new vocabulary or identifiers that may or may not contain useful information.

SUMMARY

Embodiments of the present invention disclose a method, a computer system, and a computer program product for building pre-trained contextual embeddings. Embodiments of the present invention may include collecting programming code. Embodiments of the present invention may include loading and preparing the programming code using a specialized programming language keywords-based vocabulary. Embodiments of the present invention may include creating contextual embeddings for the programming code. Embodiments of the present invention may include storing the contextual embeddings.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
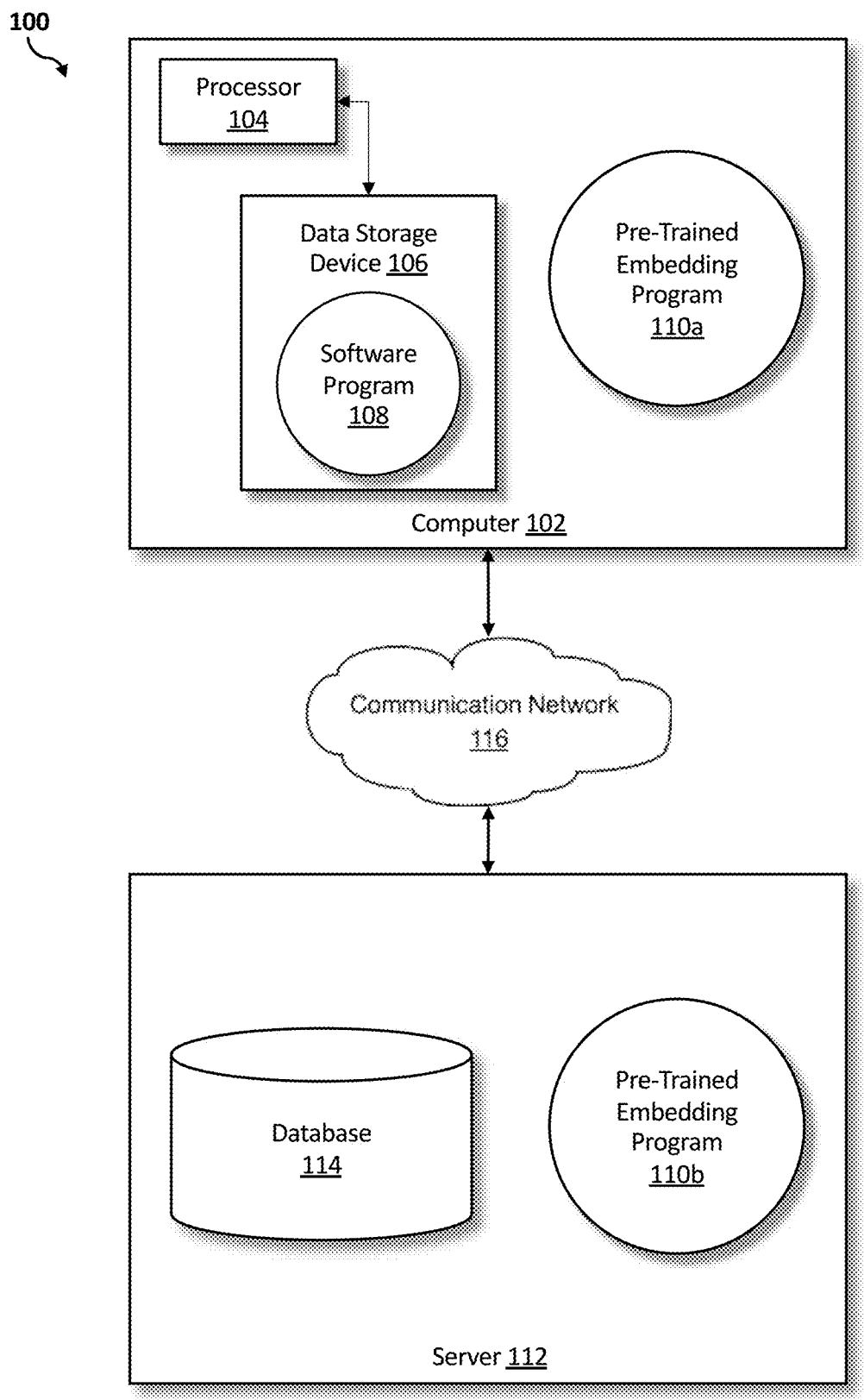
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, computer code is written in a style that is more repetitive than natural language. Natural language also has a limited number of words that can be used, however, computer programming code allows software developers to create new vocabulary or identifiers that may or may not contain useful information. For example, developers can create new identifiers which creates an out-of-vocabulary (OOV) problem. The out-of-vocabulary (OOV) problem may cause user identifiers, such as software developer creators' identifiers, to create a severe expansion of vocabulary in programming code. The identifiers may be named whatever the developer names the identifier and the identifier may also be tagged during a language processing or a machine learning process such that the information may be lost.

Programming languages may also have unique concept keywords. Unique concept keywords are words that may only be used in one context and may only have one specific meaning. Natural human language or domain adaptation does not have this unique concept of keywords. Many natural language words may have multiple meanings and may only be understood in a context of a whole phrase or sentence. Domain adaption, as it relates to machine learning or transfer learning, is a process that adapts a model from a source distribution to a target distribution.

There has been a large amount of effort to exploit the naturalness and the repetitiveness of code language using statistical methods. Some efforts use sub-word tokenization to solve the out-of-vocabulary (OOV) problem, however, this approach is a non-deterministic approach and may require a large vocabulary to solve the problem. Natural language processing (NLP) and machine learning (ML) may be used during a pre-training process of solving the out-of-vocabulary (OOV) problem, however, may still be non-deterministic and require a large vocabulary for pre-training and training a model.

For instance, natural language processing (NLP) may not be processed correctly due to incorrect tagging, classification or labeling of words. For machine learning (ML), the information provided by the words or special meanings of the words may be lost. Probabilistic models may require different designs, modeling and learning for natural language and for programming language. Therefore, it may be advantageous to, among other things, create a system that both trains contextual embeddings for machine learning and solves the out-of-vocabulary (OOV) problem.

The following described exemplary embodiments provide a system, a method and a program product for building contextual embeddings for programming code language. As such, embodiments of the present invention have the capacity to improve the field of software analysis and machine learning by creating a system that pertains contextual embeddings that also creates a deterministic solution for the out-of-vocabulary (OOV) problem. Improvements to machine learning model training and a reduced time to train a model is created by building contextual embeddings and using programming language keywords. More specifically, software analysis will be improved by building pre-trained contextual embeddings for source code using specialized vocabulary which will also solve the out-of-vocabulary (OOV) problem. Additional benefits may include solving programming code or source code issues, such as code searches, auto documentation, bug identification, vulnerability identification, code-based QA and programming language translations.

Improving machine learning model training time by using programming language keywords may incorporate and use various types of machine learning (ML) models that may ingest pre-trained contextual embeddings for model learning, training and operation. Training data may include computer program code, such as source code, from various domain applications, such as retail, social media content, business, technology, medical, academic, government, industrial, food chain, legal or automotive. Models may be trained and updated with pre-trained contextual embeddings using supervised, unsupervised and semi-supervised machine learning procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

According to an embodiment, natural language processing may be used to extract tokens in source code to identify source code word contexts. A token may include a word or a part of a word. For example, the word "language" may have one or more tokens associated with the word, such as one token may represent "lang", "gua" or just one character "l". A term (e.g., a word) or a token may refer to multiple potential meanings in natural language and in programming language, however, programming language may contain language specific keywords and the language specific keywords may only contain one meaning.

In addition to tokenization, natural language processing may also extract key features using word embedding techniques that map words and phrases to vectors of numbers using mathematical embeddings. Word embeddings may create an understanding of the occurrence of words or terms in a document corpus. When word and phrase embeddings are used, the natural language processing accuracy may improve the semantic analysis. Pre-trained models and deep learning models that use natural language processing and word embeddings may provide more accurate predictive results.

A pre-trained language model may include a model that is designed as a benchmark model for a particular dataset. A pre-trained model may also be called a natural language processing (NLP) model. The particular dataset used for pre-trained models may use contextual embeddings for learning. Contextual embeddings may typically be learned using natural language processing, however, since programming language may differ from natural language, pre-trained contextual embeddings may be created to for a pre-trained model to use for learning. Model training using natural language processing may be accomplished by feeding a model an unannotated dataset for training purposes. The unannotated or unstructured data may be classified or tagged for model training.

Structured and unstructured data may be used as datasets to train contextual embeddings. Structured data may include data that is highly organized, such as labeled data (i.e., text file with labels), a spreadsheet or data that is stored in a fixed field. Unstructured data may include data that is not organized and has an unconventional internal structure, such as programming language, source code (e.g., a text file), a code snippet, a presentation, a webpage, an email, a word processing document or multimedia content.

Computer program data may be used for the pre-training of contextual embeddings. The computer program data may include programming language documents such as source code data and application code data. For example, source code data may be captured from an open source code repository or a private repository with proper accessibility permissions. Data may also be synthetically generated by programs that generate data.

The collection of the computer program data be stored or retrieved on one or more databases. Structured and unstructured data may be mined from domain databases to collect the data for building pre-trained contextual embeddings. Source code may include data obtained from the various domain application repositories, such as telecommunication data, medical data, financial data, legal data, legislative data, business data, transportation data, agriculture data or industrial data. For example, a project in python language in a health care domain repository.

Source code may be one type of programming code language that is available in large amounts via open-source code or also known as big code. The availability of the large amount of source code may assist in being utilized for analysis for new data-driven techniques, such as natural language processing (NLP) and machine learning (ML). For example, natural language processing may ingest, via unsupervised machine learning, a large amount of input data to learn contextual embeddings for natural language processing tasks associate with machine learning.

Source code may include computer programming language to be executed by a computing device, for example, source code project C and Java® (JavaScript and all JavaScript-based trademarks and logos are trademarks or registered trademarks of Oracle Corporation and/or its affiliates) source code project on Github® (Github and all Github-based trademarks and logos are trademarks or registered trademarks of Github, Inc. and/or its affiliates). Programming language can be viewed as a natural language that can be modeled using contextual embeddings.

A transformer is a type of neural network architecture may also utilize pre-trained contextual embeddings to train a neural network by transforming one sequence into another. The transformer may have the ability to process program data. The transformer may ingest a sequence of tokens and may transform the tokens into pre-trained contextual embeddings. The granularity of the input tokens may be adjusted based on the tokenization technique used. For example, tokens may include single characters, characters plus keywords or subwords plus a keyword.

Once a contextual embedding is created based on the tokenization technique, the contextual embeddings may be used to pre-train a model, for example, by being fed into a transformer architecture to handle a sequence to sequence process or problem. The transformer may transform one sequence into another, for example, receive embeddings as an input and provide probabilities as an output. Sequence- 2-sequence (seq2seq) may transform, for example, a sequence of words in the source code to another sequence of words. The contextual embeddings that are created may be an output of the transforming architecture.

A long-short-term-memory (LSTM) model or architecture may also be used to analyze sequence dependent data. The long-short-term-memory (LSTM) model may also be used to create contextual embeddings by ingesting tokens based on a tokenization technique and provide an output of contextual embeddings for every token ingested or received.

Contextual embeddings for a word may be captured semantically to bring the word into a correct or proper context. Semantic analysis may be used to infer the complexity of interactions, such as the meaning and intent of the language, such as the programming language or the source code for a computer. Semantic analysis may consider syntactic structures at various levels to infer meaning to a user's words, phrases or sentences.

According to an embodiment, language specific keywords from programming languages may be used to create a programming language keywords-based vocabulary that is specialized for creating a deterministic solution for the out-of-vocabulary (OOV) problem. The out-of-vocabulary problem may occur from created identifiers, for example, by software developers that may include a created word that is not contained in a regular vocabulary for natural language.

Identifiers may or may not contain useful information. For example, an identifier may be created and called createNewVocabulary by a software developer. The identifier may be replaced by a tag, label or classifier during a preprocessing phase of machine learning. Replacing the identifier with a tag may lead to a loss of information since the identifier was a word or a phrase created by a developer for computer program code. Since the word or phrase may be a new word or phrase, the tag attached at the preprocessing phase may not be accurate.

In addition to being more repetitive than natural language, program language may also be writing in different styles. For example, domain in a programming language may be considered different projects, such as FFmpeg or OpenSSL and each domain may have a different style of coding.

Deterministic solutions provided herein to create efficient programming language modeling may include using a single character or a programming language-based vocabulary, by enhancing sub-word or byte pair encoding (BPE) vocabulary or by reducing the size of a large vocabulary to a smaller subset. The deterministic solutions may be accomplished individually, in a combination or all together.

According to an embodiment, contextual embeddings may be built and pre-trained by using tokens or tokenization techniques on programming code, such as source code, to feed as an input to a transformer or a long-short-term memory (LSTM) model. The output may include a vector for every input token. The vectors may represent the created contextual embeddings. The process of building or creating the vectors may be called training or pre-training.

According to an embodiment, a single character-based vocabulary or a programming language-based vocabulary may be created using multiple methods. One method for creating a single character-based vocabulary may include tokenizing, for example, digits 0-9, lowercase a-z, uppercase A-Z or punctuation symbols. In addition to vocabulary tokenization, language specific keywords may be tokenized. Other vocabularies may be created by extending the character based vocabulary to a character plus keyword vocabulary by adding language specific keywords.

According to an embodiment, subword tokens or byte pair encoding (BPE) vocabulary may be used and enhanced by adding language specific keywords to the vocabulary. For example, language specific keywords may be added manually to the vocabulary for characters and the vocabulary for characters plus keywords. A subword-based vocabulary may be manually added if the subwords are not already present in the vocabulary. Some subword techniques may create a vocabulary automatically that may only have a subset of the language specific keywords, however, the missing subwords may be added manually.

For example, for a C language program, tokenization of a sentencepiece or a subword with a vocabulary size of 100 types may have 32 missing keywords. A type may include a character type, such as a letter, a number or a symbol. A type may also include a keyword type, such as part of a word or a whole word. Another example for a C language program may include a vocabulary size of 5000 with 1 missing keyword. Thus, if the vocabulary is smaller, then the training time may be faster, and the amount of memory used to train a model may also be reduced. A smaller vocabulary may allow missing keywords to be added while keeping the benefits of a faster model training time and a reduced memory load.

According to an embodiment, program language modeling may be improved by using tokenization. For example, byte pair encoding (BPE) tokenization and vocabulary. Typically, byte pair encoding (BPE) approaches (also known as sub-word or word piece approaches) to solve the out-of-vocabulary (OOV) problem do not take language specific keywords into account, thus, vocabulary generated through such techniques may or may not contain the keywords. Byte pair encoding is a data compression scheme that requires a table of data to re-create the original data that was compressed based on common pairs of consecutive bytes.

Augmenting byte pair encoding (BPE) vocabulary with programming language keywords may improve program language modeling. Augmenting the byte pair encoding (BPE) vocabulary may improve a model by ensuring that the keywords are not broken up by byte pair encoding (BPE), thus, the model may learn the embeddings more effectively and accurately. Byte pair encoding (BPE) vocabulary creation may be non-deterministic and may or may not contain programming language keywords. Sometimes the vocabulary creation may be a single character. Incorporating programming language keywords will create a deterministic way to augment the byte pair encoding (BPE) vocabulary and improve model performance.

Byte pair encoding (BPE)-like vocabulary may also be reduced to create a faster model training time. Byte pair encoding (BPE)-like vocabularies can be arbitrarily large, and as such, model training time may take a longer amount of time to train using large vocabularies. Reducing the size of a large vocabulary to a smaller subset that may include keywords or characters can be accomplished by deleting some tokens. The vocabulary size may be reduced by deleting tokens that are not tokens based on the programming language keywords.

According to an embodiment, large vocabulary may be reduced to a smaller subset by deleting types that are not related to keywords and characters. The vocabulary may contain a character type, such as "a" or a keyword type, such as "int" or any other word, such as "cat". A character plus keyword vocabulary may be obtained by deleting "cat" so that only characters, such as "a" and keywords, such as "int" are left. For example, all tokens unrelated to keywords and characters in a vocabulary may be deleted.

According to an embodiment, vocabulary may be created for machine learning training and model building. The vocabulary may be created manually, for example by adding subwords that are not already present in a vocabulary. The vocabulary may also be created automatically, for example, by using a byte pair encoding (BPE) library like sentencepiece. The vocabulary may be created to include a collection of type of words that are or that will be considered valid. For example, if the vocabulary contains "a" and "a" is a valid character type, then the tokenizer may recognize "a" when reading the data. A character tokenizer may have a character vocabulary, for example, "a", "b", "1", "2", "!", etc.

A small vocabulary may be created to both speed up programming language modeling and to solve the out-of-vocabulary (OOV) problem. The created vocabulary may include character level vocabulary with programming language keywords. A small vocabulary with only language specific keywords and single characters may be created. The character level vocabulary may be generalized for all programming languages in various domains that were created by many different software developers.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a pre-trained embedding program 110a. The networked computer environment 100 may also include a server 112 that is enabled to run a pre-trained embedding program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the pre-trained embedding program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the pre-trained embedding program 110a, 110b (respectively) to analyze, detect and predict vulnerabilities of a computing system using contextual embeddings. The contextual embedding method is explained in more detail below with respect to FIG. 2.

Figure 2:
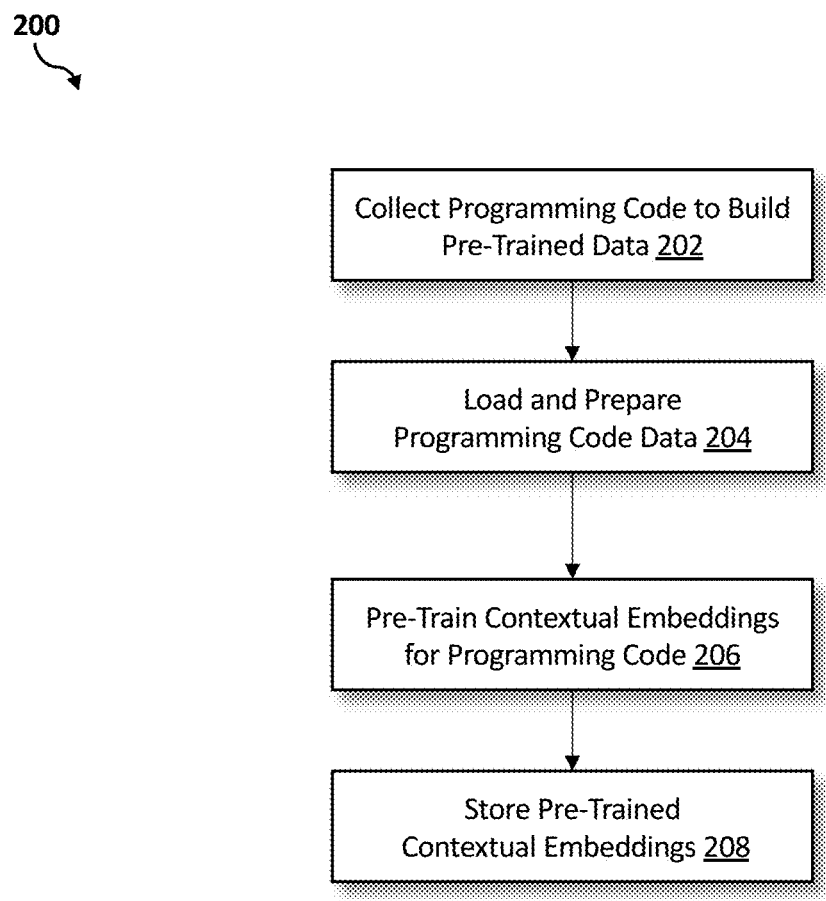
FIG. 2 is an operational flowchart illustrating a process for building pre-trained contextual embeddings for source code using specialized vocabulary according to at least one embodiment.

Referring now to FIG. 2, an operational flowchart illustrating the exemplary building pre-trained contextual embeddings for source code process 200 used by the pre-trained embedding program 110a, 110b according to at least one embodiment is depicted.

At 202, programming code is collected to build pre-trained data. Programming code may include, for example, source code collected and used for the purposes of training a model for a pre-training phase. The source code may be collected from an open source computer programming repository. The source code may be used as training data to create and build contextual embeddings for programming language. Source code may be collected from various repositories that store source code for multiple domains. Source code collected for training may be obtained, for example, from source code projects or an open source accessibility to source code. Source code and other types of computer programming code may be collected from domain specific applications with proper accessibility to the source code repositories.

At 204, programming code data is loaded and prepared. The collected programming code, such as source code, may be loaded by a data loader and converted into a form that a model can identify and be trained from. Data loading may include reorganizing the training data to a form used for training if the data obtained from the repository is not already in the required form. Raw data that is collected may often contain comments or empty lines that may not be useful and may be removed during data loading. For example, if the source files obtained from a repository and used for training data are in the required form, then no changes may need to be made for the data loading process and alternatively, if some of the data is not in the required form, then the data loader can reorganize or transform the source file data to information that the model can use or consume for training.

Loading and preparing data may use programming language keywords to create specialized tokenizers. The loading and preparing the programming code may use a specialized programming language keywords-based vocabulary. The training data may be tokenized. Tokenizing the training data may be accomplished at a character level or at a single character plus keyword level. For example, a character tokenizer may be used at a character level. Character tokenization may be extended to include programming language keywords as types. Tokenizing the training data may also be accomplished by adding keywords as types. Tokenizing training data may also be accomplished by using a sub-word method, such as byte pair encoding (BPE).

Subword techniques may also be extended by including programming language keywords as types. The process of vocabulary creation using subword tokenization may or may not include keywords, however, if keywords are present, they may be included.

At 206, the contextual embeddings are pre-trained for programming code. The process of creating contextual embeddings may also be known as pre-training or training. For example, contextual embeddings may be created as pre-training data and the embeddings may used for fine tuning. The pre-training may consist of unsupervised learning on, for example, transformer architecture, natural language models or machine learning models to apply training to the contextual embeddings.

The collected, loaded and prepared programming code or source code with the built contextual embeddings may be considered model training data and allocated for model pre-training or model training. The model training may include, for example, utilizing the training data as data to train a natural language model or a machine learning model. The training data may include the ability to use a smaller dataset to train the model for a specific task. The natural language model may be trained, for example, as a pre-trained model using a smaller dataset, such as source code, to perform a specific task, such as creating embeddings for the source code. Other pre-trained models may also be used with the collected training data, such as bidirectional encoders to encode the loaded training data.

At 208, the pre-trained contextual embeddings are stored. The pre-trained contextual embeddings that have been built and created for programming code or source code may be stored in a file to be used in conjunction with other files, such as configuration files, vocabulary files and other files depending on the usage of the files. The pre-trained contextual embeddings may be stored in a repository or a database for later use.

The database that stores the trained model may be accessed during use or future use, such as for pre-train model building, a fine-tuning phase or other machine learning uses. The pre-trained contextual embeddings have learned how programming language is written and as such, can perform many downstream tasks that may be built and used in addition to the pre-trained model. Other downstream tasks may include a fine-tuning phase, added classification and labels of datasets to perform particular machine learning tasks or to use the pre-trained model as is or as a machine learning model.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
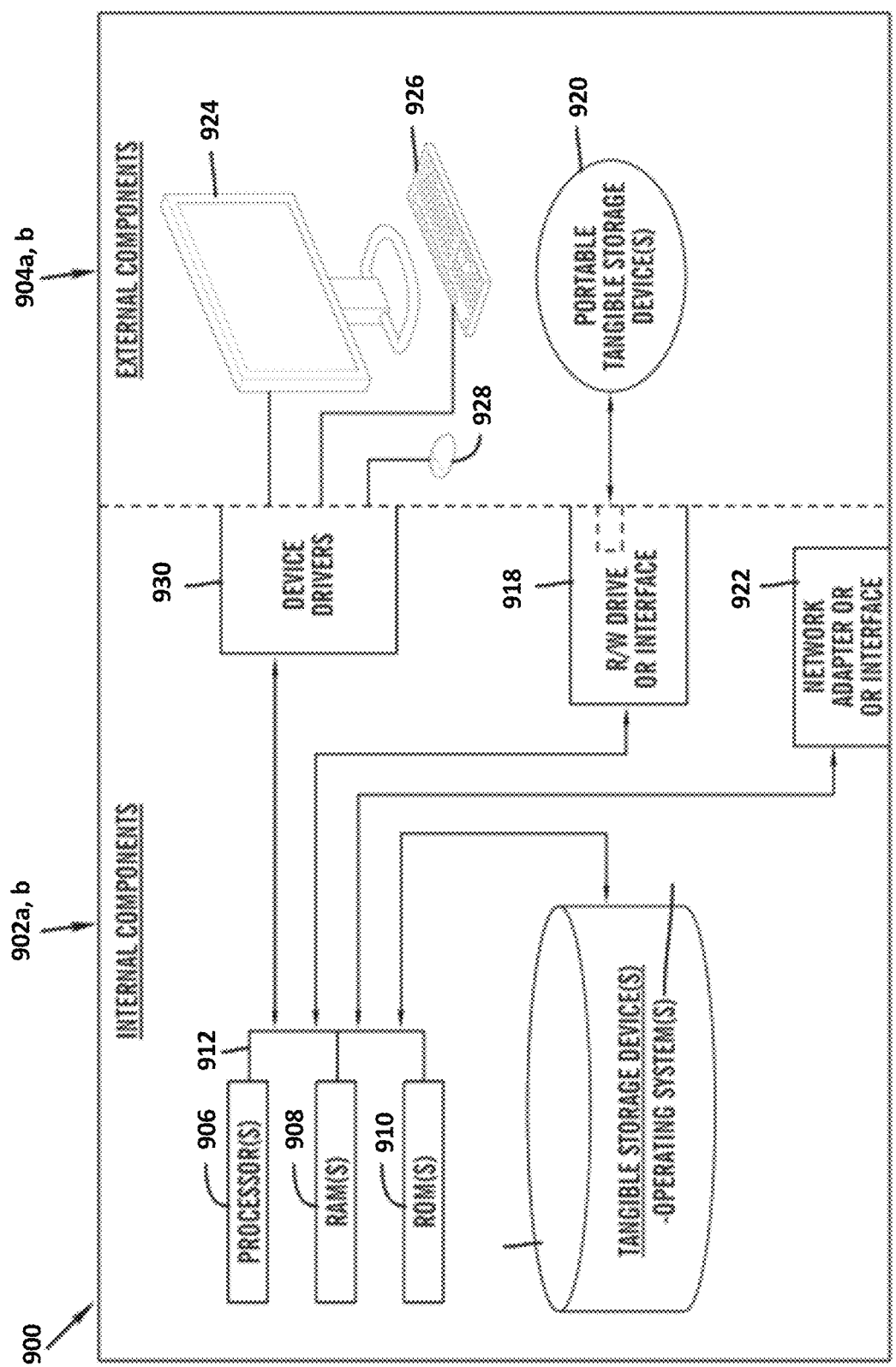
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the pre-trained embedding program 110a in client computer 102, and the pre-trained embedding program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the pre-trained embedding program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the pre-trained embedding program 110a in client computer 102 and the pre-trained embedding program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the pre-trained embedding program 110a in client computer 102 and the pre-trained embedding program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
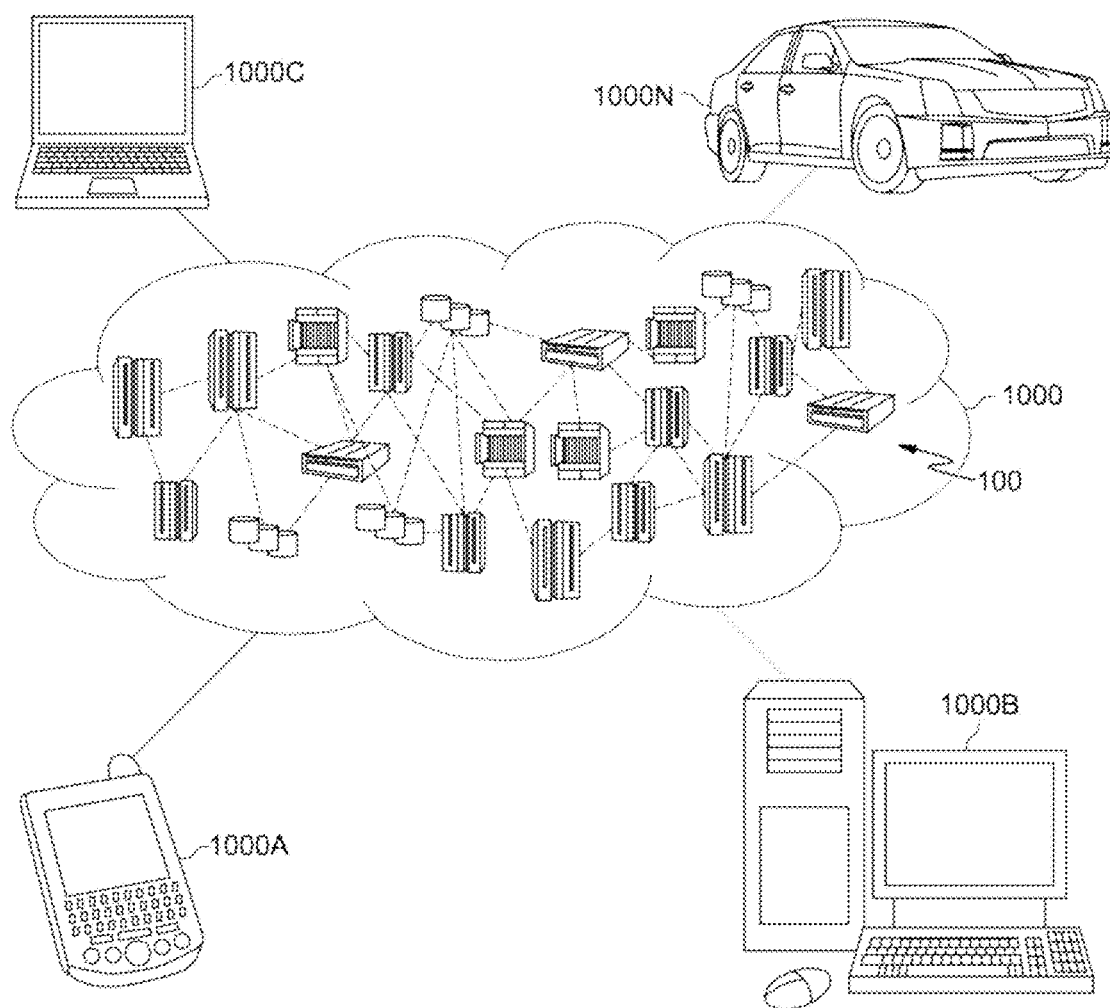
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
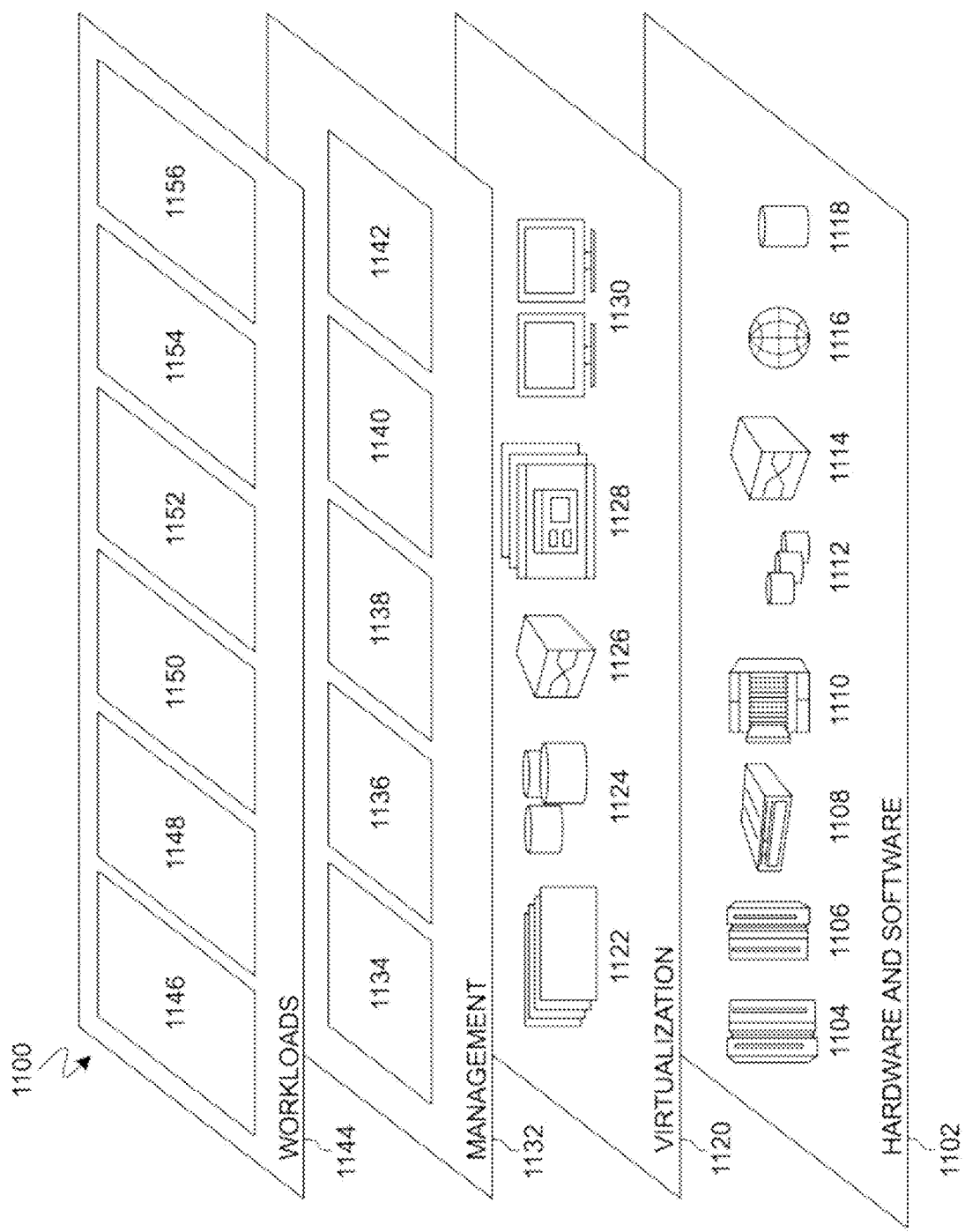
FIG. 5 is a block diagram of functional layers of the illustrative cloud computing environment of FIG. 5, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and vulnerability analysis using contextual embeddings 1156. A pre-trained embedding program 110a, 110b provides a way to build pre-trained contextual embeddings for source code using specialized vocabulary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for building pre-trained contextual embeddings, the method comprising:
   collecting programming code;
   loading and preparing the programming code using a specialized programming language keywords-based vocabulary;
   creating contextual embeddings for the programming code using the specialized programming language keywords-based vocabulary;
   determining a context for the programming code based on the contextual embeddings, wherein the contextual embeddings are associated with one or more vectors;
   using natural language processing (NLP) to perform language modeling to initialize the one or more vectors based off the words in the programming code;
   extracting one or more tokens in the programming code to identify word contexts in the programming code; and
   storing the contextual embeddings,
      wherein the contextual embeddings are stored as pre-trained contextual embeddings that are built to use pre-trained models, fine tuning models or machine learning models.

2. The method of claim 1, wherein the contextual embeddings are stored as pre-trained contextual embeddings that are built to use with programming languages in conjunction with configuration files and vocabulary files.

3. The method of claim 1, wherein the programming code consists of source code.

4. The method of claim 1, wherein the loading and preparing the programming code includes loading the programming code into a data loader and converting the programming code into a required form.

5. The method of claim 1, wherein the creating contextual embeddings includes creating character tokens for the programming code using byte pair encoding (BPE).

6. The method of claim 1, wherein the contextual embeddings are pre-trained for the programming code.

7. A computer system for building pre-trained contextual embeddings, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
      collecting programming code;
      loading and preparing the programming code using a specialized programming language keywords-based vocabulary;
      creating contextual embeddings for the programming code using the specialized programming language keywords-based vocabulary;
      determining a context for the programming code based on the contextual embeddings, wherein the contextual embeddings are associated with one or more vectors;
      using natural language processing (NLP) to perform language modeling to initialize the one or more vectors based off the words in the programming code;
      extracting one or more tokens in the programming code to identify word contexts in the programming code; and
      storing the contextual embeddings,
         wherein the contextual embeddings are stored as pre-trained contextual embeddings that are built to use pre-trained models, fine tuning models or machine learning models.

8. The computer system of claim 7, wherein the contextual embeddings are stored as pre-trained contextual embeddings that are built to use with programming languages in conjunction with configuration files and vocabulary files.

9. The computer system of claim 7, wherein the programming code consists of source code.

10. The computer system of claim 7, wherein the loading and preparing the programming code includes loading the programming code into a data loader and converting the programming code into a required form.

11. The computer system of claim 7, wherein the creating contextual embeddings includes creating character tokens for the programming code using byte pair encoding (BPE).

12. The computer system of claim 7, wherein the contextual embeddings are pre-trained for the programming code.

13. A computer program product for building pre-trained contextual embeddings, comprising:
one or more computer-readable tangible storage media and program instructions stored on at least one of the one or more computer-readable tangible storage media, the program instructions executable by a processor to cause the processor to perform a method comprising:
collecting programming code;
loading and preparing the programming code using a specialized programming language keywords-based vocabulary;
creating contextual embeddings for the programming code using the specialized programming language keywords-based vocabulary;
determining a context for the programming code based on the contextual embeddings, wherein the contextual embeddings are associated with one or more vectors;
using natural language processing (NLP) to perform language modeling to initialize the one or more vectors based off the words in the programming code;
extracting one or more tokens in the programming code to identify word contexts in the programming code; and
storing the contextual embeddings,
wherein the contextual embeddings are stored as pre-trained contextual embeddings that are built to use pre-trained models, fine tuning models or machine learning models.

14. The computer program product of claim 13, wherein the contextual embeddings are stored as pre-trained contextual embeddings that are built to use with programming languages in conjunction with configuration files and vocabulary files.

15. The computer program product of claim 13, wherein the programming code consists of source code.

16. The computer program product of claim 13, wherein the loading and preparing the programming code includes loading the programming code into a data loader and converting the programming code into a required form.

17. The computer program product of claim 13, wherein the creating contextual embeddings includes creating character tokens for the programming code using byte pair encoding (BPE).

* * * * *